United States Patent
Ritto

(10) Patent No.: US 7,661,508 B1
(45) Date of Patent: *Feb. 16, 2010

(54) LIGHTWEIGHT SPEAKER ENCLOSURE

(75) Inventor: Ross Ritto, Encinitas, CA (US)

(73) Assignee: Southern California Sound Image, Escondido, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/015,158

(22) Filed: Jan. 16, 2008

Related U.S. Application Data

(63) Continuation of application No. 11/151,687, filed on Jun. 13, 2005, now Pat. No. 7,337,874, which is a continuation of application No. 10/635,698, filed on Aug. 5, 2003, now Pat. No. 6,913,110.

(60) Provisional application No. 60/401,431, filed on Aug. 5, 2002.

(51) Int. Cl.
- *A47B 81/06* (2006.01)
- *B29C 47/06* (2006.01)
- *B29C 65/40* (2006.01)
- *E04B 1/82* (2006.01)
- *H05K 5/00* (2006.01)

(52) U.S. Cl. .................. 181/199; 181/151; 181/292; 156/245; 156/285

(58) Field of Classification Search ............... 181/199, 181/151, 292, 148, 146, 290, 296; 156/245, 156/285, 286, 307.3
See application file for complete search history.

(56) References Cited

U.S. PATENT DOCUMENTS 1,965,830 A    7/1934  Hammer (Continued)

FOREIGN PATENT DOCUMENTS

JP    57060795 A    4/1982

(Continued)

OTHER PUBLICATIONS

Brochure, "Lytex® Versus Aluminum and Magnesium, Stiffness Comparison," Quantum Composites, Inc., Subsidiary of Premix, Inc.

(Continued)

*Primary Examiner*—Edgardo San Martin
(74) *Attorney, Agent, or Firm*—Knobbe, Martens, Olson & Bear, LLP

(57) ABSTRACT

A speaker enclosure having a substantially seamless rigid outer skin, a middle sound absorbing layer, and a substantially seamless inner skin results in a lightweight speaker having sound absorbing characteristics. The speaker enclosure is comprised of two basic parts, a box section and a baffle section where each of these sections include a rigid outer skin, the middle sound absorbing layer and a seamless inner skin and are made according to the same method. The outer skin is formed from a layer of sheet molding compound, the middle sound absorbing layer includes pieces of honeycomb material, and the inner skin is formed from a layer of sheet molding compound. The layers of material are placed into a mold and then cured through vacuum bagging and heating thereby producing a strong, lightweight speaker enclosure made of materials which attenuate the transmission and retransmission of errant sound waves in the enclosure thereby reducing distortion of the sound signal produced by the speaker.

9 Claims, 6 Drawing Sheets

U.S. PATENT DOCUMENTS

| | | | |
|---|---|---|---|
| 2,670,053 A | | 2/1954 | Doms |
| 3,430,728 A | * | 3/1969 | Dunning ............... 381/348 |
| 3,804,195 A | | 4/1974 | Everitt et al. |
| 3,848,696 A | * | 11/1974 | Everitt ............... 181/156 |
| 3,985,201 A | | 10/1976 | Kloster |
| 4,042,778 A | | 8/1977 | Clinton |
| 4,071,111 A | * | 1/1978 | Croup ............... 181/149 |
| 4,109,983 A | | 8/1978 | Kinoshita |
| 4,284,168 A | | 8/1981 | Gaus |
| 4,596,305 A | | 6/1986 | Jagborn |
| 4,802,551 A | * | 2/1989 | Jacobsen ............... 181/146 |
| 4,811,403 A | | 3/1989 | Henricksen et al. |
| 4,905,860 A | | 3/1990 | Kurihara |
| 4,957,184 A | | 9/1990 | Negishi |
| 4,964,482 A | | 10/1990 | Meyer |
| 5,067,583 A | * | 11/1991 | Hathaway ............... 181/151 |
| 5,168,129 A | | 12/1992 | D'Antonio |
| 5,218,176 A | | 6/1993 | Meyer, Jr. |
| 5,519,178 A | | 5/1996 | Ritto et al. |
| 5,701,359 A | * | 12/1997 | Guenther et al. ............ 381/431 |
| 5,916,405 A | | 6/1999 | Ritto et al. |
| 5,949,033 A | | 9/1999 | Anagnos |
| 6,206,999 B1 | | 3/2001 | Ritto et al. |
| 6,598,700 B1 | * | 7/2003 | Schroeder ............... 181/199 |
| 6,687,381 B2 | * | 2/2004 | Yanagawa et al. ........... 381/423 |
| 6,896,096 B2 | * | 5/2005 | Nevill et al. ............... 181/199 |
| 6,913,110 B1 | | 7/2005 | Ritto |
| 7,337,874 B1 | | 3/2008 | Ritto |
| 2003/0002702 A1 | | 1/2003 | Cox et al. |

FOREIGN PATENT DOCUMENTS

| | | |
|---|---|---|
| JP | 59090205 A | 5/1984 |
| JP | 59-191995 | 10/1984 |

OTHER PUBLICATIONS

Brochure, "Lytex™ Brand SMC Provides Excellent Adhesion to Metallic Inserts."

Reprint, "Design: SMC Structural Composites: High Strength at Low Cost," William I. Childs, Quantum Composites, Inc., *Plastics Engineering*, Feb. 1989, pp. 37-39.

Brochure. "Lytex™ Brand SMC Provides Excellent Heat Stability and Corrosion Resistance."

Advanced Composites, Reprinted from *Advanced Composites*, Nov./Dec. 1990.

Brochure. "Thread Shear Strength Test Results," Quantum Composites, Inc., Subsidiary of Premix, Inc., Rev. Apr. 1991.

Brochure. "Comparison of Lytex® to Aluminum Case Study," Quantum Composites, Inc., Subsidiary of Premix, Inc., Sep. 1985.

Brochure. "Lytex™ Brand, Epoxy Sheet Molding Compounds are Engineered to Meet Your Composite Applications," Quantum Composites, Inc., 1983.

* cited by examiner

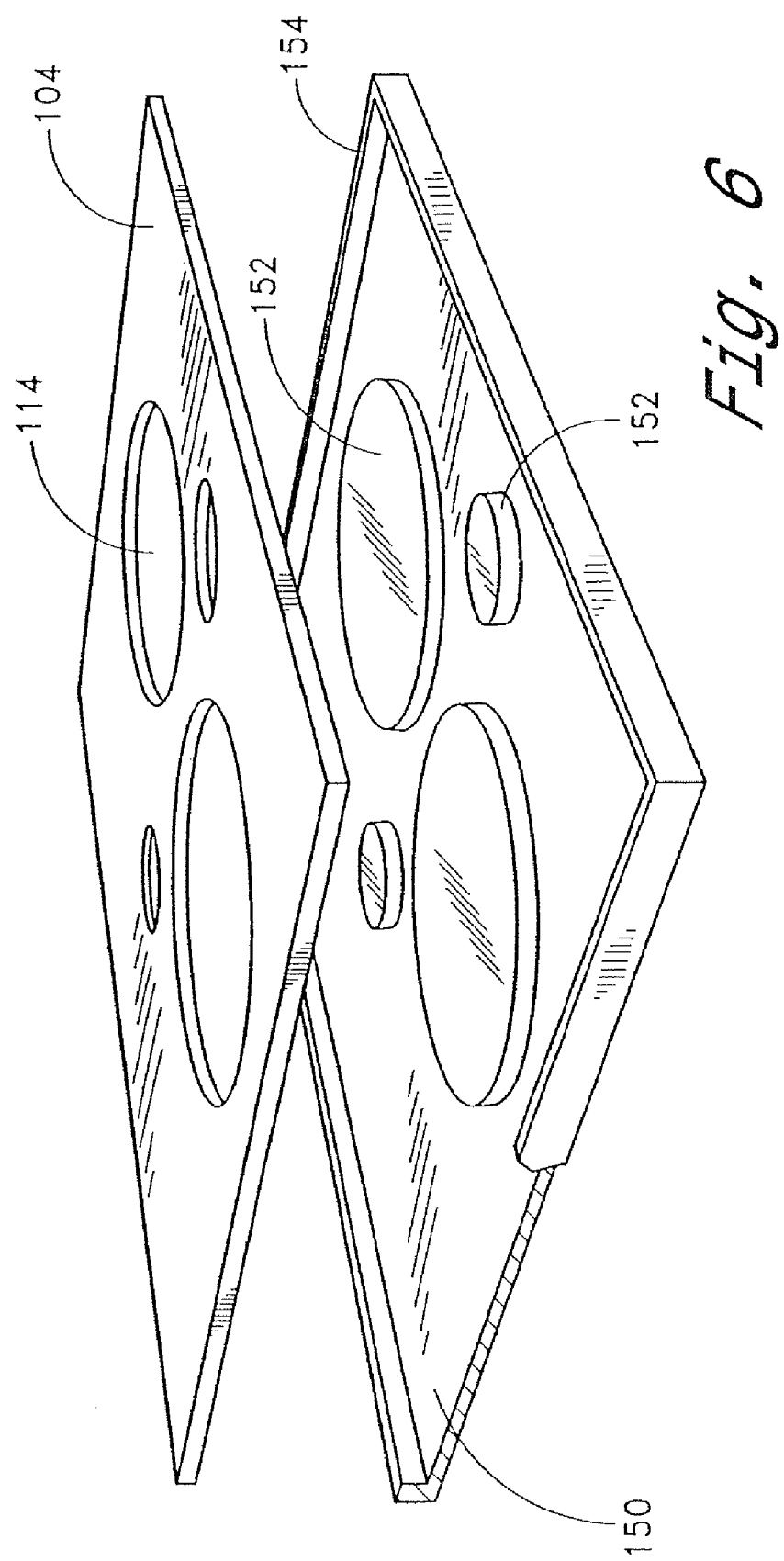

LIGHTWEIGHT SPEAKER ENCLOSURE

RELATED APPLICATIONS

This application is a continuation of U.S. application Ser. No. 11/151,687, filed Jun. 13, 2005, now U.S. Pat. No. 7,337,874 entitled "LIGHTWEIGHT SPEAKER ENCLOSURE" which is a continuation of U.S. application Ser. No. 10/635,698 filed Aug. 5, 2003 now U.S. Pat. No. 6,913,110 and entitled "LIGHTWEIGHT SPEAKER ENCLOSURE," which claims the benefit of U.S. Provisional Application No. 60/401,431, filed Aug. 5, 2002, all of which are incorporated by reference in their entirety herein.

BACKGROUND OF THE INVENTION

1. Field of the Invention

The present invention relates to speaker enclosures and, in particular, concerns a seamless speaker enclosure fabricated from lightweight, sound absorbing materials.

2. Description of the Related Art

Speaker enclosures are used in various applications ranging from home entertainment to music concerts. Conventional speaker enclosures are typically constructed from semi-rigid materials, such as plywood, and have a box-like shape. The front side of the speaker enclosure includes a baffle which has several openings in which the diaphragm portion of the speaker is positioned so that sound emanates from the speaker enclosure. A significant drawback of conventional speaker enclosures is weight. For example, large speakers used at music concerts typically require large speaker enclosures. Generally, large speaker enclosures have to support the weight of the large speakers, and consequently, can be very heavy. As a result, the heavier the speaker enclosure, the more difficult it is to move and support.

Another difficulty that results from constructing speaker enclosures from plywood is that these materials often degrade the sound performance of the speaker. In one aspect, most of the sound that is produced by the speaker should emanate outward from the diaphragm of the speaker away from the speaker enclosure. However, plywood has a tendency to vibrate in response to these inwardly travelling errant sound waves. These errant vibrations can result in distortion of the sound produced by the speakers, including a retransmission of resonant sound waves that tend to magnify unwanted frequencies. To reduce these vibrations, sound engineers have often placed materials inside of the speaker enclosure to dampen the errant sound waves and reduce vibrations. However, placing extraneous materials and objects inside the speaker enclosure results in degradation of the sound performance of the speaker.

One way of dealing with the weight and vibration problems is taught in U.S. Pat. No. 5,519,178, the text of which is hereby incorporated by reference in its entirety. The reference teaches forming a plurality of overlapping carbon fiber layers, at least one sound absorbing layer, and a plurality of fiberglass layers in a mold, wherein each layer is separately hand-laid into position. The formed layers are then cured using heat to thereby create a substantially seamless speaker enclosure having some vibration dampening properties. Unfortunately, the proposed labor intensive fabrication processes are expensive and time consuming, which results in high manufacturing costs. Moreover, speaker enclosure production is bottlenecked by the lengthy curing times required by the layers of materials used, thus drastically affecting part throughput, which also increases manufacturing costs.

Another problem associated with U.S. Pat. No. 5,519,178 is that the reference teaches the use of one or more interposed adhesive layers to bond the inner and outer layered materials to the sound absorbing layer. In some circumstances, the adhesive layers can be incompatible with the inner and outer layered materials. Even after curing, the one or more adhesive layers can form discontinuous bonding regions between the layers. Unfortunately, pockets of gaseous molecules may form in non-adhered regions, which may allow errant vibrations to occur during use. If errant vibrations are not properly attenuated or re-transmitted, then the sound absorbing performance of the speaker enclosure is degraded.

In addition, non-adhered regions may also degrade the seamless integrity of the speaker enclosure. When the seamless integrity of the speaker enclosure is compromised, the inner layers, outer layers, and sound absorbing layer can flex in relation to one another as a result of errant sound waves impinging upon the speaker enclosure walls. This can result in a greater vibration of the speaker enclosure and can increase the amount of errant sound waves escaping from the back and sides of the speaker enclosure.

From the foregoing, there currently exists a need for a more economical lightweight speaker enclosure that reduces distortion of sound signals produced by the speakers as a result of errant sound waves emanating from the speaker enclosure. To this end, there is a need for a speaker enclosure that is fabricated from strong lightweight materials that have sound absorbing qualities. Furthermore, an improved speaker enclosure should also comprise seamless structural characteristics so as to reduce unwanted vibrations and improved part throughput by reducing the mold lay-up times and part cure times.

SUMMARY OF THE INVENTION

The aforementioned needs are satisfied by the sound speaker enclosure of the present teachings which generally includes a three-layer box section formed of an outer skin of a rigid material, a middle layer of a sound absorbing material, and an inner skin of a rigid material; and a baffle section that includes the same three-layer construction. As used herein, the term "box" is used to denote various shapes of the enclosure having one open side and should not be limited to specific dimensions or shapes. The baffle section can then be bonded to the box section of the speaker enclosure to thereby complete the speaker enclosure.

In one aspect, the invention comprises a method of forming a speaker enclosure where an outer layer of resin impregnated material, such as sheet molding compound, is positioned within a mold. A layer of sound absorbing material is then formed, such as by positioning pieces of honeycombed sound absorbing material on the outer layer. Subsequently an inner layer of resin impregnated material, such as sheet molding compound is positioned on the sound absorbing layer. The materials in the mold are then heated and cured such that the resin in the resin impregnated materials adhered substantially all over inner and outer surfaces of the sound absorbing layers and also so that the resin flows such that the sheet molding compound defines a single substantially seamless layer.

In another aspect, other semi-liquid resin impregnated molding compounds, such as gunk molding, are spread over the mold or over the sound absorbing layer. The semi-liquid molding compounds are then cured to define the substantially seamless outer and inner layers and to adhere the layers to the sound absorbing layer.

These and other objects and features of the present teachings will become more fully apparent from the following description and appended claims taken in conjunction with the accompanying drawings.

BRIEF DESCRIPTION OF THE DRAWINGS

FIG. 6 is a perspective view of a male mold used to fabricate the baffle section of the speaker enclosure shown in FIG. 1.

DETAILED DESCRIPTION OF PREFERRED EMBODIMENTS

Figure 1:
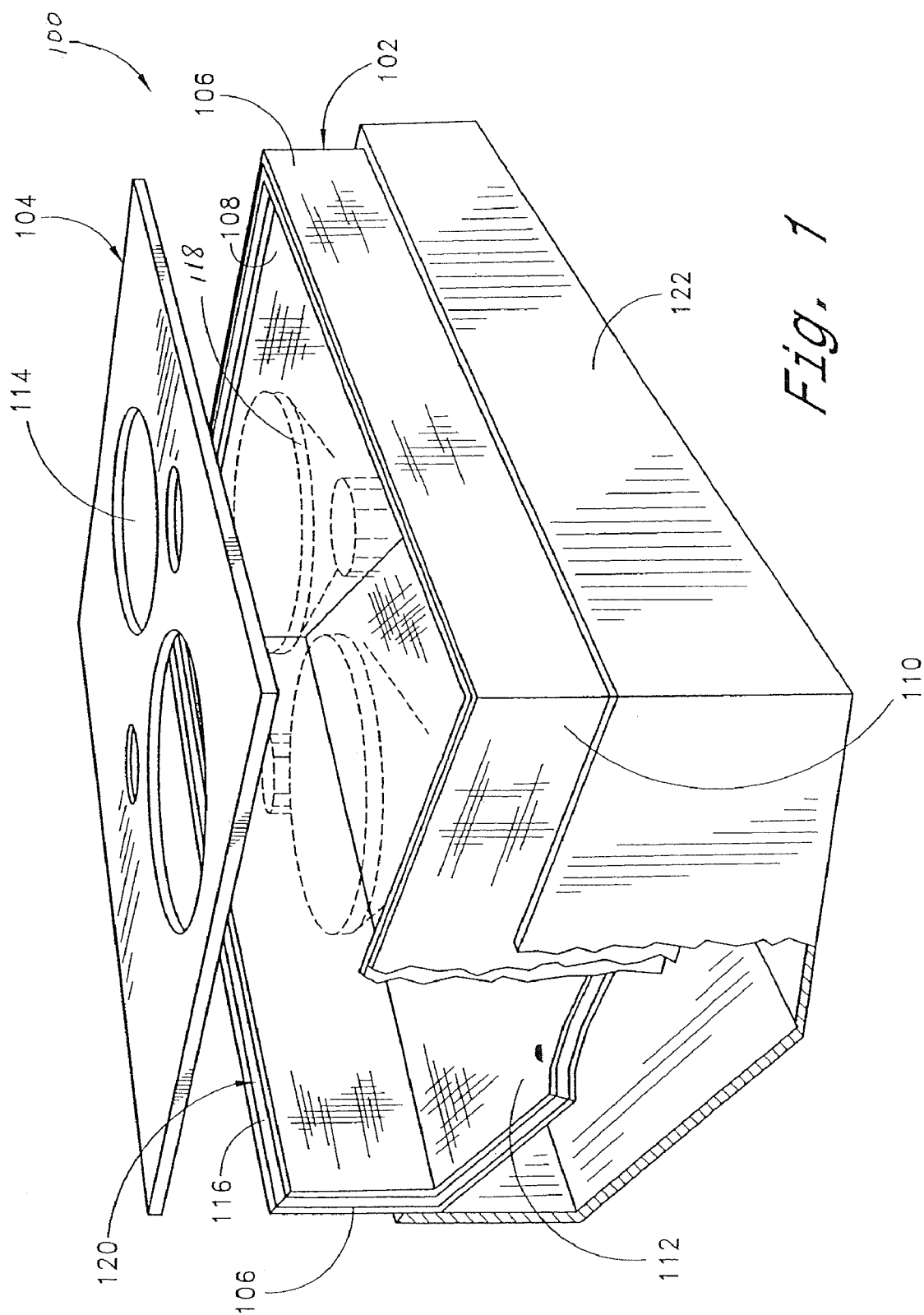
FIG. 1 is a perspective view of a speaker enclosure, which is partially cut away to illustrate the layers of material comprising the walls of the speaker enclosure.

Reference will now be made to the drawings wherein like numerals refer to like parts throughout. FIG. 1 illustrates a speaker enclosure 100 according to one embodiment of the construction techniques described herein. The speaker enclosure 100 is comprised of two basic component parts, a box section 102 and a baffle section 104. The box section 102 defines a volume of space in which one or more speakers 118 (shown in phantom) are positioned. In an embodiment of the speaker enclosure 100 shown in FIG. 1, the box section 102 is shown to have a generally rectangular shape comprising opposing sidewalls 106, a top wall 108, a bottom wall 110, and a back wall 112. In one embodiment, the back wall 112 of the enclosure comprises two planar walls that extend from a back edge of each side wall, and form an obtuse angle at their intersection. The top and bottom walls 108, 110 are generally pentagonally shaped to achieve an open box configuration wherein the top, bottom, opposing side, and back walls are adjoining. The exposed front edges of the top, bottom, and side walls define a front, open face which provides access to the interior space of the enclosure.

The baffle section 104 includes one or more openings 112 where the speakers 118 are mounted such that the diaphragm portions of the speakers communicate through the openings 114 to the outside of the speaker enclosure 100. The baffle section 104 is dimensioned to rest on a ledge 116 which continues around the inside perimeter of the front edge 110 of the box section 102 of the enclosure 100. In one embodiment, the ledge 116 may be dimensioned to allow the baffle section 104 to rest flush with front edge of the box section 102. The ledge 116 may also be made or formed of a material which provides a surface whereby the baffle section 104 can be securely bonded to the box section 102, such as Styrofoam. It should be appreciated that the speaker enclosure 100 can be at least one of a number of shapes and sizes depending upon the intended application for the speaker. Hence, the following description of the construction of the speaker enclosure 100 is readily adaptable to various sizes and shapes of the speaker enclosure and is not limited to the exact enclosure shown in these figures.

The cut away section of FIG. 1 illustrates that the walls of the box section 102 and, in some instances, the baffle section 104 are comprised of a sandwiched composite of layers, which are positioned in a mold 122 and then cured in the manner described below. The mold 122 may comprise, in one embodiment, a female wood mold which has the same dimensions and configuration as the outside of the box section 102 of speaker enclosure 100. The mold 122 is constructed in a generally known manner and then sanded and finished to allow for easy removal of the box section 102 after fabrication, thus resulting in a mold having a finished interior surface and falling within the dimensional limits dictated by the engineering tolerances.

Figure 2:
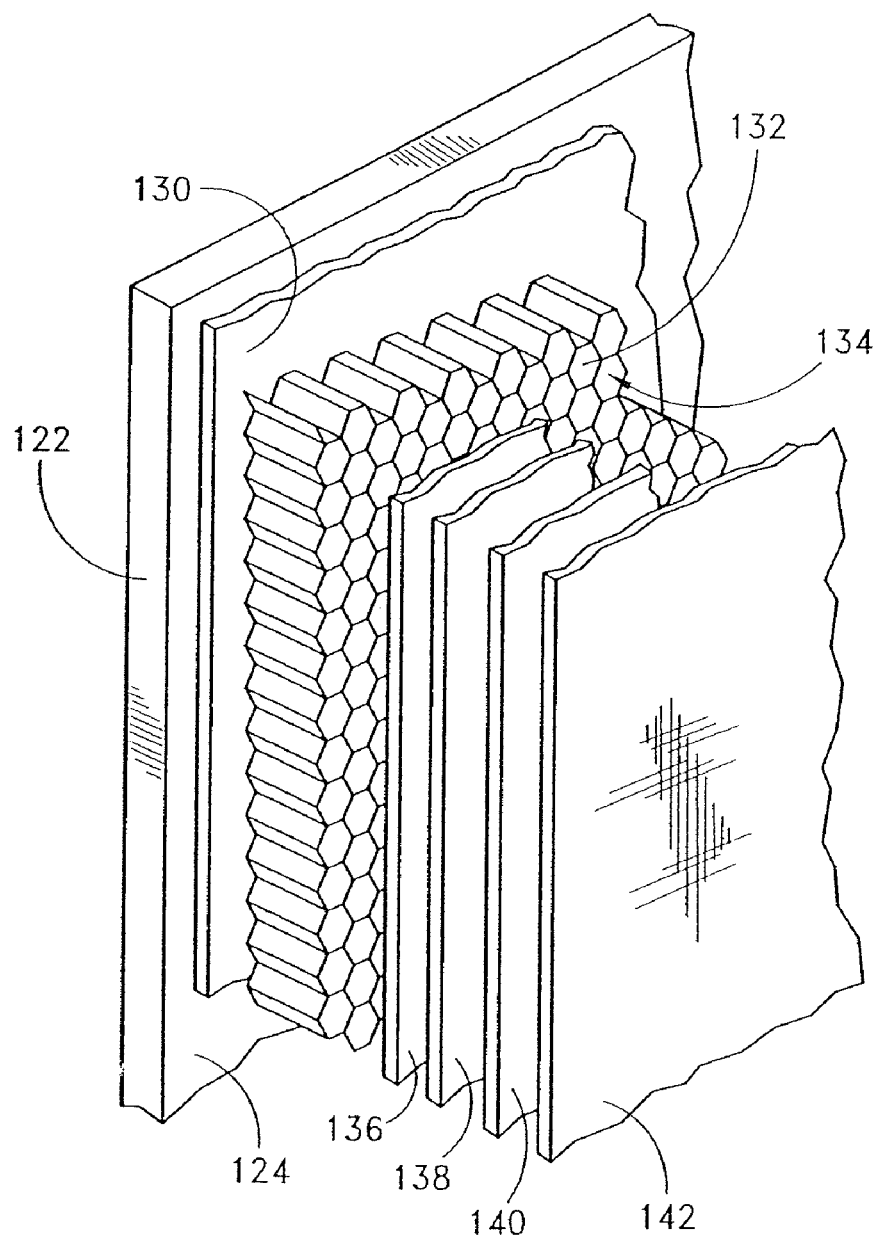
FIG. 2 is an exploded perspective view of a section of one of the walls of the speaker enclosure of FIG. 1 which illustrates the layers of the speaker enclosure in greater detail.

The layers that are positioned in the mold 122 to produce the walls of the box section 102 of the sound enclosure 100 will now be described by reference to FIG. 2. FIG. 2 is an exploded perspective view of the layers that comprise both the walls of the box section 102 of the enclosure 100 and the wall of the baffle section 104. These layers are positioned in the mold 122 and are then vacuum bagged and cured using conventional techniques that are described in greater detail hereinbelow.

Generally, the mold 122 is initially coated with one of more release agents to permit easy subsequent removal of the speaker enclosure 100 from the mold 122 once it has been cured. In one embodiment, the inner surface 124 of the mold 122 can be coated with one or more coats of Chemlease MPP117 sealer and allowed to dry. In addition, one or more coats of Chemlease 41-90 can also be applied and allowed to dry between the coats of Chemlease MPP117 sealer. These products are manufactured by Chemlease of Howell, Mich.

Once the release agent is applied to the mold 122, the first of the layers 130 is then positioned inside of the mold 122. Specifically, a single layer of SMC 130 is positioned inside of the mold 122. In one embodiment, the material 130 comprises an epoxy sheet molding compound sold under the tradename LYTEX™, which is sold in sheet form in a semi-rigid state. In one aspect, a single sheet of SMC may be cut and folded to approximate the size and shape of the enclosure and is then inserted into the mold 122, however, multiple pieces of SMC can alternatively be cut and fit into the mold. These plurality of SMC pieces can either be overlapping, or abutting one another as will be shown in more detail in relation to FIGS. 4 and 5.

The first layer of SMC 130 may optionally be topped with a layer of film adhesive (not shown) to provide additional resin to permeate the SMC 130 and aid in bonding to the sandwiched sound absorbing material 132, as will be discussed hereinafter. In one embodiment, a layer of film adhesive is not required, as the SMC resin will flow under normal curing temperatures and pressures and will thus permeate and adhere to the sound absorbing material 132 without the addition of extraneous resin. Advantageously, as will be described in greater detail herein below with reference to FIG. 3A, this tends to form a first continuous adhering layer 144 (shown in FIG. 3A) between the first layer of SMC 130 and the sound absorbing layer 132.

Once the first layer of SMC is positioned inside of the mold 122, a plurality of pre-cut pieces of sound absorbing material 132 are then positioned inside of the mold 122 adjacent to the first SMC layer 130. The sound absorbing material 132 comprises a material that defines a plurality of air pockets 134, which are capable of absorbing sound waves produced by the speaker 118. In one embodiment, the sound absorbing material 132 comprises NOMEX™ brand material. NOMEX™, which is manufactured by DuPont, comprises resin impregnated material formed into a plurality of open cells, wherein the open cells are filled with gas, and, in one aspect, air may be used. It should be appreciated that, in general, NOMEX™ brand material may be used, but there are various other similar products on the market that can be used without departing from the scope of the present teachings. Some of these similar products are made from plastic or plain paper materials as well as some exotic materials, such as carbon fiber and glass. In addition, various types of metal or metal alloy cores are also available. Moreover, there are many other densities as well as cell sizes. Densities can range from approximately 1 lb to 10 lbs. Cell size can range from approximately ⅛" upwards to about ½" and, in some cases, larger. Therefore, in one embodiment, a small portion of the sound absorbing layer comprises a resin-impregnated material, while the remainder of the sound absorbing layer comprises a gas.

In one embodiment, the sound absorbing material 132 is rigid and cannot be folded to conform to the mold 122. Moreover, adjacent pieces cannot overlap one another and must abut along their edges. Hence, the sound absorbing material 132 is cut into a plurality of pieces which may be configured so that a increased surface area of the first layer 130 is covered with the sound absorbing material 132. In one aspect, as few pieces of sound absorbing material 132 as possible may be used while still covering the first layer 130 to thereby reduce gaps between pieces and further to reduce cutting and mold lay-up time. As can be appreciated, the exact dimensions of the pieces of sound absorbing material 132 depend upon the configuration of the speaker enclosure 100, which can vary depending upon the desired shape and use of the enclosure.

Once the plurality of pieces of sound absorbing material 132 have been positioned in the mold 122, one or more pieces of film adhesive (not shown) may optionally be positioned on top of the layer of sound absorbing material 132. In one embodiment, the layer of film adhesive comprises a rigid sheet of resin and may comprise, for example, the same resin utilized in the sheet molding compound. The added layer of resin aids in bonding the sound absorbing material 132 to a second layer 136 of SMC. Alternatively, the film adhesive layer may be omitted, and a second layer 136 of SMC may be positioned directly adjacent to the sound absorbing material 132. As will be described in greater detail herein below with reference to FIG. 3A, this tends to form a second continuous adhering layer 146 (shown in FIG. 3A) between the second layer of SMC 136 and the sound absorbing layer 132.

In one embodiment, the first and second layers 130, 136 of SMC are each formed substantially of a single sheet of SMC and are cut and folded to approximate the size and shape of the enclosure prior to being placed into the mold 122. Optionally, the first and second layers 130, 136 of SMC can be preheated to a temperature of about 140° F. to 160° F. to soften the material to encourage its malleability in order to pre-form it into the proper shape of the mold 122.

Figure 4:
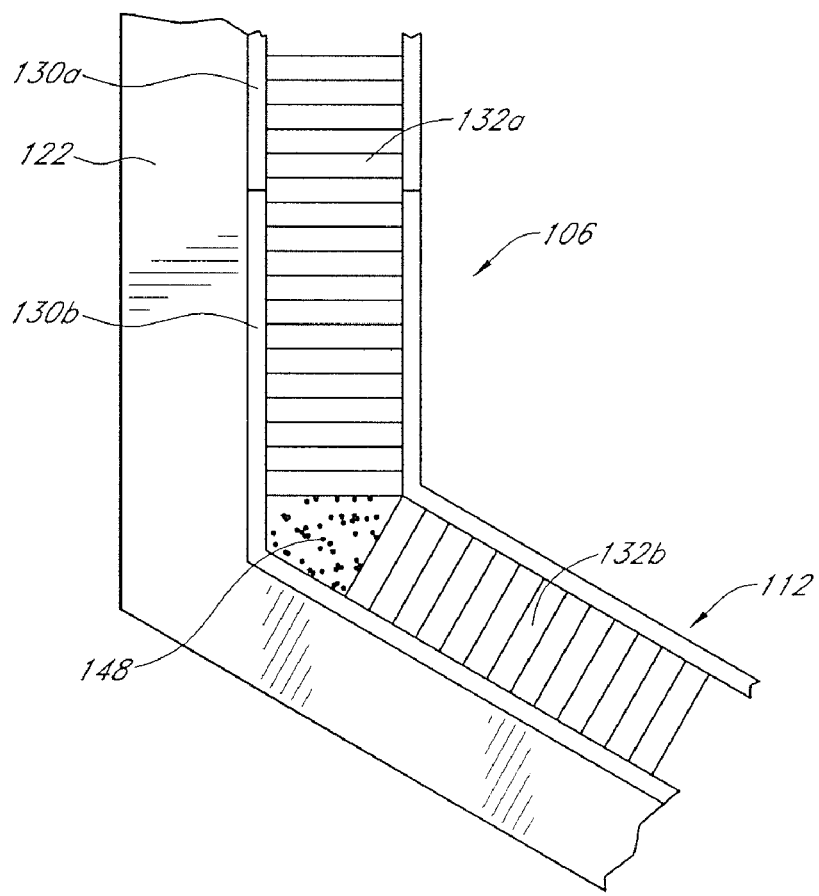
FIG. 4 is a exploded view of a circled section of two of the walls of the speaker enclosure shown in FIG. 3A which further illustrate the organization of the layers of material forming the walls of the speaker enclosure.
Figure 5:
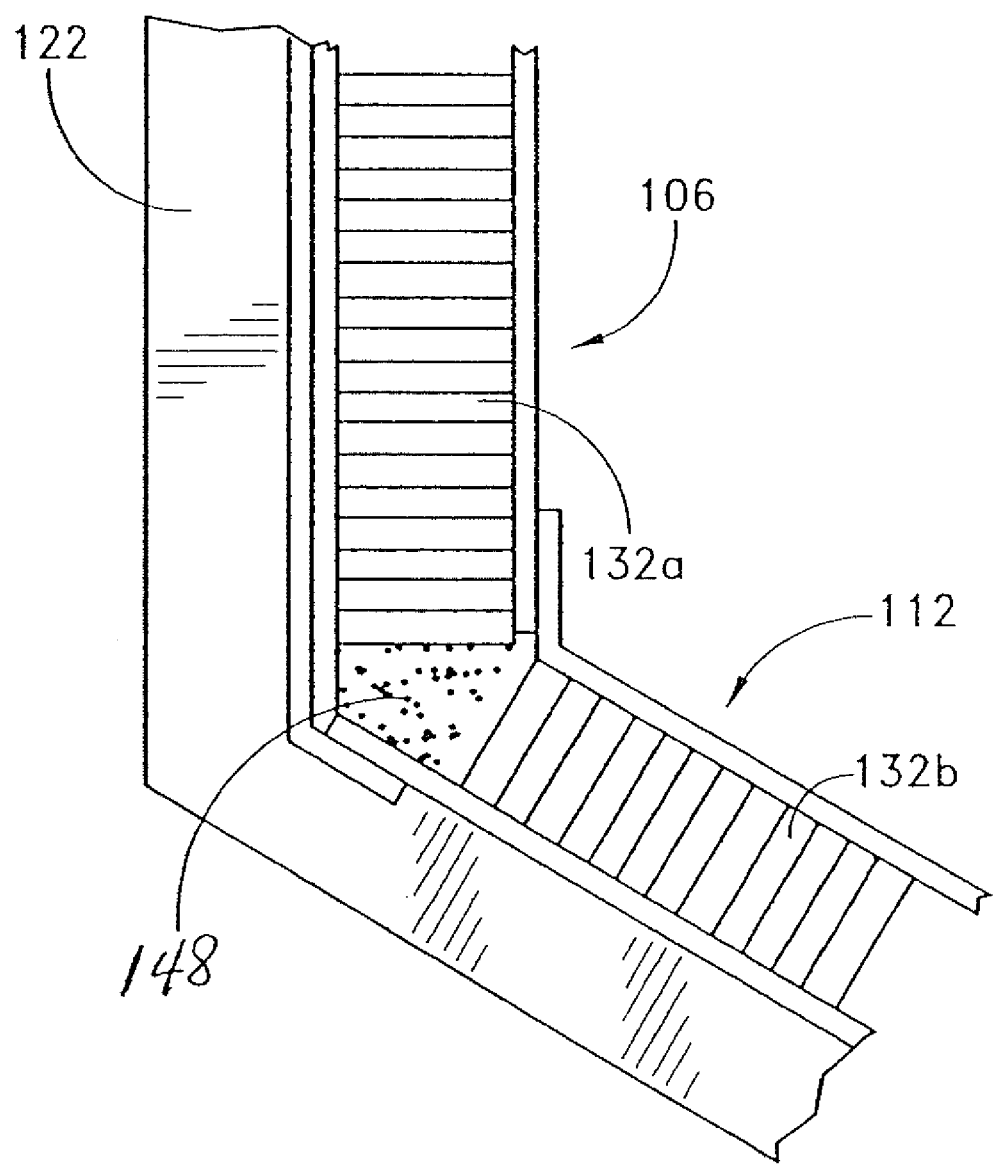
FIG. 5 is a partial view showing two adjoining walls of the speaker enclosure.

In another embodiment, the first 130 or second 136 SMC layer, or both, may comprise of a plurality of pieces of SMC which are positioned in the mold 122 and arranged to approximate the finished size and shape of the enclosure. Where a plurality of pieces of SMC are used, the pieces may either overlap one another, or may be abutting as illustrated in FIGS. 4, 5. In either case, the SMC resin will have a tendency to flow under curing pressures and temperatures thereby permeating at least a portion of the sound absorbing material 132, thus fusing the first 130 and second 136 layers of SMC to the sound absorbing material 132 in a manner so as to form continuous adhering layers therebetween. Also, the pressures during the curing process will cause the resin to fluidly flow to fill various gaps between the pieces of sound absorbing material 132 and will then cure into a substantially uniform-thickness monolithic structure.

A layer of release fabric 138, a layer of perforated release film 140 and a layer of air weave material 142 can then be positioned adjacent to the second SMC layer 136, respectively. In one embodiment, the layer of release film 140 and air weave material 142 may be positioned over the front face 110 of the box section 102 of the enclosure 100 and may be firmly attached at their periphery to the mold 122. In one aspect, these layers allow excess resins and volatiles to escape from the layers of SMC and sound absorbing material 132 upon curing of the box section 102 of the enclosure 100. Additionally, the air weave material 142 allows air to pass therethrough to aid in a vacuum bagging process, which will be discussed in greater detail hereinafter.

Once each of these layers is positioned in the mold 122, a vacuum bag (not shown) is positioned over the mold 122 wherein the materials are cured through a vacuum bagging process as is well known in the art. More specifically, an assembled mold comprising the mold 122, first layer 130, sound absorbing material 132, and second layer 136 are vacuum cured over a given temperature in the range of from about 150° F. to about 300° F., and more preferably within the range of from about 225° F. to 250° F., for a time period within the range of approximately 3 minutes to about 15 minutes.

In one embodiment, the vacuum bagging process may be conducted at pressures ranging between approximately 25-29 in Hg (12-15 psi). In addition, the curing process can be conducted at a temperature of approximately 250° F. for a cure time of approximately 5 minutes. Also, the assembled mold can be initially positioned in an oven, which is heated to approximately 140-160° F. Once the assembled mold attains this temperature, the oven can be heated to 250° F., where the assembled mold can then cure for approximately 5 minutes. In one aspect, it should be appreciated that the mold can be heated as rapidly as the oven can heat from 160° F. to 250° F., which can take approximately 15 minutes. Moreover, cool down can take approximately 10 minutes. Additionally, it should be appreciated by one skilled in the art that the pressures, temperatures, and process times including ranges thereof may vary without departing from the scope of the present teachings.

In one aspect, this offers a significant advantage over prior art methods of forming speaker enclosures. A significant drawback of prior art speaker enclosures is the cure time. The use of SMC allows the cure time to be reduced by nearly twelve fold to approximately 5 minutes. This time advantage allows a manufacturer to greatly increase part throughput without necessitating the use of additional expensive molds. In addition, the prior art has not found an effective way to vacuum bag a composite sandwich comprising a material such as the disclosed honeycomb because of the curing pressures required. Accordingly, it is a significant advantage in the art to combine a composite skin material that can be cured at pressures below the compression threshold of the honeycomb sound absorbing layer.

In one aspect, the curing process results in hardening of the resin contained in the SMC layers. Consequently, after the curing process, the walls of the enclosure 100 are then comprised of three basic layers of material, a rigid outer skin 130, a layer of sound absorbing material 132 and a rigid inner skin 136. Since the SMC used for the first and second skin 130, 136 has a tendency to fluidly flow at molding temperatures and pressures, the outer and inner skins will have virtually no seams between the adjacent walls of the box portion 102. Moreover, even if the inner and outer skins were assembled of a plurality of pieces of SMC, these pieces will cure to form a single layer, having a substantially uniform thickness.

Figure 3A:
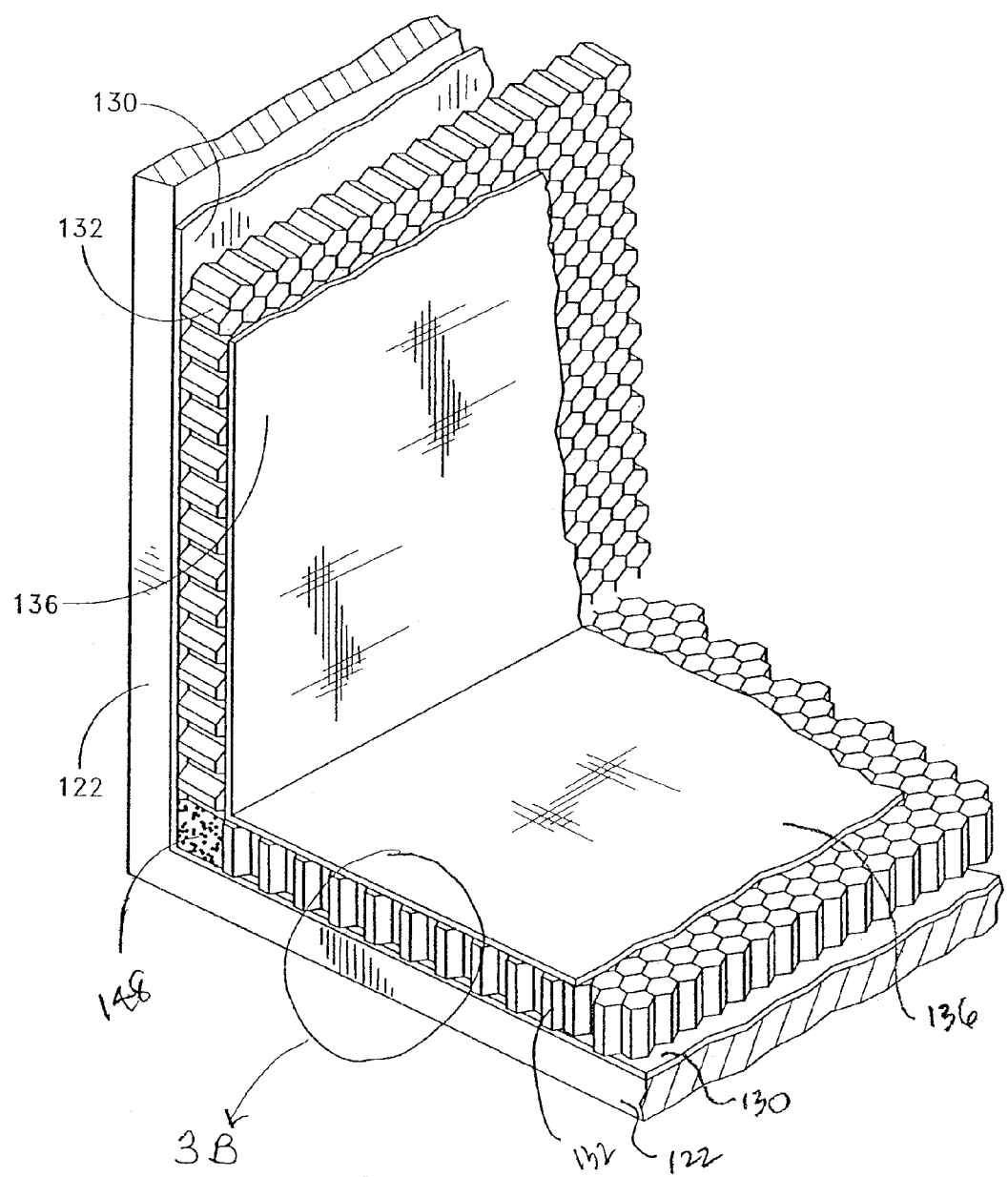
FIG. 3A is a partial perspective view of a section of two of the walls of the speaker enclosure, taken along lines 3-3 of FIG. 1, which further illustrates the organization of the layers of material forming the walls of the speaker enclosure.
Figure 3B:
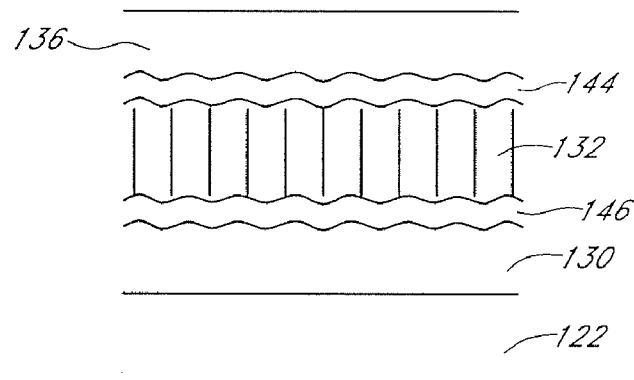
FIG. 3B is a side view of one of the walls of the enclosure of FIG. 3A.

Additionally, as illustrated in FIGS. 3A, 3B, the curing process of SMC materials results in a more seamless box enclosure 100. Advantageously, the use of SMC materials in the first and second layers 130, 136 provides better adherence to the sound absorbing layer 132 than prepreg carbon fiber materials or fiberglass materials used in the prior art reference (U.S. Pat. No. 5,519,179). During the curing process, the SMC material fuses to the sound absorbing material to form the continuous adhering layers 144, 146 between the SMC layers 130, 136 and the sound absorbing layer 132. In one embodiment, the SMC layers 130, 136 fuse to the sound absorbing layer 132 to a depth or thickness ranging between approximately 0.010 and 0.1 inches so as to form the continuous adhering layers 144, 146.

Advantageously, in one aspect, the continuous adhering layers 144, 146 reduce flexing between the layers 130, 132, 136, which reduces the occurrence of errant vibrations during use of the speaker enclosure. Hence, less vibration of the speaker enclosure reduces the amount of errant or distorted sound waves escaping from the back and sides of the speaker enclosure, which improves the overall performance and quality of the sound waves emanating from the speaker enclosure.

In one embodiment, the skins 130, 136 are sufficiently rigid so as to both reduce the tendency of the box section 102 of the enclosure 100 to vibrate in response to errant sound waves produced by the speaker 118, and to securely hold the enclosed speaker. As can be appreciated, the skins 130, 136 can be made of a number of different materials that will cure into a hardened rigid box including other SMC products, carbon materials, Kevlar, fiberglass, and the like. Various molding techniques, including gunk molding compounds, bulk molding compounds, and liquid molding compounds, may also be used to form the skins 130, 136.

The placement of the SMC is more clearly illustrated in FIGS. 3A, 3B, and 4. In one embodiment, each of the first and second skin layers 130, 136 are formed of a single piece of SMC that has been folded to approximate the size and shape of the finished box section. Alternatively, pieces of SMC can be placed within the mold, either abutting or overlapping to fill at least about 70% of the surface area of the mold, and about 100% of the volume of the finished part. The inner 136 and outer 130 layers of SMC sandwich a layer of sound absorbing material 132 that has been cut to substantially fill the surface area therebetween. Additional pieces of SMC may be positioned adjacent the gaps between pieces of sound absorbing material 132, and will subsequently flow into and substantially fill these gaps during the curing process. In one aspect, excess resin from the first and second layers will flow into the spaces 140 between the pieces of sound absorbing material 132 to form a substantially continuous, seamless layer throughout the entire box section 102 of the enclosure 100. Accordingly, as illustrated, the resin tends to fill one or more gaps 148 between multiple pieces of sound absorbing material 132.

As illustrated in FIGS. 4 and 5, the placement of the first and second layers 130, 136 may either be abutting or overlapping in the case where multiple pieces of SMC are used to form each layer. For example, utilizing a single piece of SMC to form each layer results in a fast mold lay-up time because a single sheet is easier to install than multiple layers. However, using multiple pieces allows the use of smaller, less than complete pieces of material which results in lower material losses, plus provides the added advantage of allowing extra SMC to be placed in the gaps between the pieces that make up the sound absorbing layer 132. FIG. 4 shows how multiple pieces of SMC can be arranged to abut one another. This Figure illustrates a corner between adjacent walls of the enclosure, such as the side wall 106 and back wall 112. The first layer 130 may comprise multiple pieces 130a, 130b that can be abutting one another. As the materials are cured, the individual pieces will fluidly intermix and fuse into a single solid surface. Moreover, as the curing temperature exceeds the resin's glass transition temperature, it will begin to fluidly flow under the normal curing pressures exerted through the vacuum bagging process. Subsequently, the flowing resin tends to fill gaps 148 between the sound absorbing materials 132a, 132b.

FIG. 5 illustrates how multiple pieces of SMC may be overlapping within the mold prior to curing. In one aspect, the overlapping occurs toward a corner in the mold 122 such that the excess resin will be forced to flow into the gaps 148 located between the pieces of sound absorbing material 132a, 132b. In some instances, this overlapping may be beneficial because additional resin is available to flow into the gaps 148 to create a seamless structure. As discussed above, a single sheet of SMC results in a faster mold lay-up time, and additional pieces of scrap SMC may be placed or positioned in each corner of the enclosure to ensure a sufficient volume of resin is available to fill one or more gap regions 148.

Advantageously, the seamless nature of the box section 102 of the enclosure 100 ensures that one wall of the box section 102 of the enclosure does not flex relative to another wall of the enclosure 100 as a result of errant sound waves impinging upon the walls. As previously described, the fusion of the SMC layers 130, 136 to the sound absorbing layer 132 during curing produces a more seamless structure, which reduces flexing between layers 130, 132, 136. In one embodiment, the continuous adhering layers 144, 146 reduces the adverse effects of errant vibrations during use of the speaker enclosure. In one aspect, less vibration of the speaker enclosure reduces the amount of errant sound waves escaping from the back and sides of the speaker enclosure. Beneficially, there is less distortion of the sound signal generated from the speakers 118 mounted in the speaker enclosure 100.

Generally, acoustical energy results in the transmission of errant sound waves in at least two principal manners: (1) directly escaping sound, and (2) retransmission of undesirable sound waves. In some enclosures that have seams between the components, there may be gaps through which the sound waves can travel and thereby escape from within the enclosure. Other sound waves become retransmitted as they are first attenuated by the enclosure itself, which resonates at its natural frequencies, and retransmits errant sound waves at frequencies corresponding with the natural frequencies of the enclosure.

Advantageously, in one embodiment, the three-layer construction of the walls of the enclosure result in a substantially seamless structure that reduces various gaps or seams through which sound waves may escape. Moreover, the sound absorbing material 132, serves to absorb some of the acoustical energy and thereby reduce the errant sound waves emanating from the speaker enclosure.

Additionally, the three-layer structure of the walls of the box enclosure result in reduced retransmission of errant sound waves as compared to conventional disclosures. More specifically, the rigid skin is significantly more rigid than other materials used in the construction of conventional speaker enclosures such as plywood. Consequently, the speaker enclosure 100 as a whole is subject to reduced vibration in response to errant sound waves as compared to prior art speaker enclosures of plywood construction, thereby reducing the retransmission of errant sound waves. In addition, the sound absorbing material 132 further acts as a chamber, in a manner analogous to the chamber created by double wall construction of sound studios, to absorb and dissipate the acoustical energy created by the speaker to further reduce errant sound waves.

Generally, the sound waves emanating from the speaker inside the enclosure impart kinetic energy to the enclosure in the form of vibration. The enclosure will have a natural resonating frequency determined by material characteristics such as size, rigidity, and density. It is possible to "tune" the enclosure's natural resonating frequency such that the intensity of retransmitted sound waves is reduced, thereby attenuating some of the sound distortion. One way of accomplishing this is by creating a discontinuous material, or distinct layers, through which the sound waves must travel. For example, the inner skin 136 will receive the acoustical energy at its greatest intensity because it is directly exposed to the errant sound waves produced by the enclosed speaker 118 and will begin vibrating at its resonant frequency in response thereto. The inner skin 136 will, in turn, impart the acoustical energy, in the form of kinetic energy, to adjacent molecules, which comprise the sound absorbing material 132 in at least one disclosed embodiment. The sound absorbing material 132 will also have a resonating frequency determined by its material characteristics. As disclosed in connection with at least one embodiment, the sound absorbing material 132 comprises a honeycomb material having voids defined by honeycomb cells. The honeycomb material will have a resonating frequency, which will generally be different than that of the inner skin 136, which will dissipate some of the intensity as the sound waves require energy to be transmitted from the inner skin 130 to the materials comprising the sound absorbing layer 132. Finally, the sound absorbing material 132 will dissipate energy in transmitting the acoustical energy to the outer skin. This further attenuates the acoustical energy thereby reducing the intensity with which the errant sound waves are transmitted to the atmospheric air, where they are free to travel to the ears of a listener.

In one aspect, sound can be attenuated by converting the acoustical energy into a different form of energy, such as, for example, heat. Sound waves are pressure waves that propagate due to vibration between adjacent molecules. This vibration can be converted to heat through molecular friction resulting in a reduction in errant sound emanating from the enclosure. In addition to attenuation through molecular friction, varying the speed of the sound waves may further reduce the intensity of the errant sound waves. Sound travels at different velocities through various media. Sound waves generally travel fastest in solids, slower in liquids, and slowest in gases. Consequently, by enclosing a layer of gas, such as air, through which the sound waves must travel to escape the enclosure, the sound waves may become attenuated by dissipating energy as the sound waves must first travel through the air to the inner skin, to the sound absorbing material 132, to the outer skin, and finally to the atmosphere. Therefore, by creating multiple layers of differing materials through which the sound waves must travel, the waves may be further dissipated.

Accordingly, in one aspect, errant sound waves can be efficiently dissipated from within the enclosure by varying the media through which the sound waves travel. It should be appreciated that the construction techniques discussed herein provide a plurality of barriers that serve to dissipate the errant sound waves. Optionally, the voids within the sound absorbing material 132 may be filled with a gas having a relatively high molecular weight to further dissipate the errant sound waves.

The foregoing description has presented a method of fabricating the box section 102 of the speaker enclosure 100. In one embodiment, the baffle section 104 can be fabricated using a suitable male mold according to the above described method with the above-described materials. Referring now to FIG. 6, a sample male mold 150 used to fabricate the baffle section 104 is shown. As illustrated in FIG. 6, the mold 150 includes a plurality of raised bosses 152 corresponding with the desired openings 114 in the baffle section 104. In addition, the mold 150 has a lip 154 around its periphery which projects outward from the surface of the mold 150 a distance sufficient to retain the layers inside of the mold 150 during fabrication. Moreover, it should be appreciated that the exact shape and configuration of the mold 150 and the pieces of materials forming the layers depends upon the desired shape and configuration of the baffle section 104.

Hence, in one embodiment, the baffle section 104 is fabricated by cutting a first skin from a single piece of SMC to substantially cover the molding surface of the baffle mold. Secondly, pieces of sound absorbing material 132 are cut and positioned to substantially cover the first layer of SMC. Finally, a second skin is cut from a single piece of SMC to substantially cover the sound absorbing material 132 layer. As discussed above, the skins may alternatively be formed of a plurality of SMC pieces, either overlapping or abutting. The baffle mold is processed in the same manner as described above in connection with the box section. Specifically, the baffle mold is vacuum bagged according to the molding parameters discussed herein. Accordingly, the baffle section 104 can be made or formed of the same materials as the box section 102 and, thus, has the same advantages in weight, strength, and sound absorption. In one aspect, the enclosure 100 may comprise a seamless box section 102 and a baffle section 104 that have the above described sound absorbing characteristics.

As described above in reference to FIG. 1, the baffle section 104 can be mounted flush on the ledge 116 formed in the box section 102. In one embodiment, the ledge 116 is formed from pieces of Klegicell brand foam manufactured by Barracuda Technologies Inc. of Desoto, Tx. which are bonded to the perimeter of the front face 120 of the box section 102 and also to the baffle section 104 of the enclosure 100. In another embodiment, the foam ledge 116 is bonded to both the box section 102 and the baffle section 104 of the enclosure using RF912/130 two part epoxy from Resin Formulators Co. of Culver City, Calif.

Advantageously, the sound speaker enclosure, as described herein, comprises, in one embodiment, a substantially seamless construction of sound absorbing materials. Further, the materials used in one embodiment of the speaker enclosure 100 described herein result in a speaker enclosure 100 that is significantly lighter yet stronger than many comparably sized prior art speaker enclosures. Moreover, the materials and methods described herein result in an increased part throughput due to reduced mold preparation times and substantially shorter curing cycle times. Hence, the speaker enclosure and methods of manufacturing described herein result in a relatively lightweight speaker enclosure having dampening characteristics that can be manufactured more efficiently than the enclosures of the prior art.

Although the foregoing description has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit or scope of the present teachings. Consequently, the scope of the invention should not be limited to the foregoing discussion, but should be defined by the appended claims.

What is claimed is:

1. A speaker box comprising:
   an outer layer of a cured sheet molding compound;
   an inner layer of a cured sheet molding compound, wherein the outer and inner layers of the cured sheet molding compound are contoured to define an interior space to receive speaker components;
   a sound absorbing layer, having a compression threshold along a first direction that is more than a compression threshold along a second direction that is generally perpendicular to the first section, interposed between the outer and inner layers of the cured sheet molding compound;
   a continuous adhering layer interposed between the outer layer and the inner layer, wherein the continuous adhering layer is formed under a selected pressure below the compression threshold of the sound absorbing layer along the first direction, wherein the continuous adhering layer reduces errant sound vibrations.

2. The speaker box of claim 1, further comprising a layer of film adhesive interposed between the sound absorbing layer and the continuous adhering layer.

3. The speaker box of claim 1, wherein the continuous adhering layer substantially adheres to inner and outer surfaces of the sound absorbing layer to form a substantially uniform-thickness structure.

4. The speaker box of claim 1, wherein the sound absorbing layer comprises a material that defines a plurality of open structures each containing a gas.

5. The speaker box of claim 3, wherein the continuous adhering layer comprises at least one piece of sheet molding compound (SMC).

6. A speaker box comprising:
   an outer layer of a cured sheet molding compound;
   an inner layer of a cured sheet molding compound, wherein the outer and inner layers of the cured sheet molding compound are contoured to define an interior space to receive speaker components;
   a continuous frequency attenuation layer interposed between the outer layer and the inner layer, wherein the continuous frequency attenuation layer absorbs acoustical energy through a plurality of discontinuous layers;
   wherein the discontinuous layers are able to resist compression along a first direction more than along a second direction that is generally perpendicular to the first direction.

7. The speaker box of claim 1, wherein the discontinuous layers comprises pieces of honeycomb material and at least one sheet molding compound.

8. The speaker box of claim 7, wherein the pieces of honeycomb material and the sheet molding compound substantially adhere to each other to form a single substantially seamless layer of uniform thickness.

9. A method of forming a speaker enclosure using a mold that resembles the exterior dimensions of the enclosure, comprising:
   forming an outer layer by cutting and folding a single sheet of sheet molding compound to substantially conform to the dimensions of the mold;
   forming an inner layer by cutting and folding a single sheet of sheet molding compound to substantially conform to the dimensions of the mold;
   positioning a middle layer, having a compression threshold, interposed between the outer layer and the inner layer, by placing sound absorbing material substantially conforming to the dimensions of the mold;
   curing the enclosure by exposing the mold, the outer layer, the inner layer, and the middle layer to a temperature and a pressure sufficient to cure the outer layer and the inner layer to form a substantially rigid uniform structure, wherein the pressure is less
   than the compression threshold of the middle layer.

* * * * *